United States Patent
Maschmeyer et al.

(10) Patent No.: US 10,768,073 B2
(45) Date of Patent: Sep. 8, 2020

(54) METHOD FOR PERFORMING A TEST WITH A TEST SPECIMEN ON A TEST BENCH

(71) Applicant: AVL LIST GmbH, Graz (AT)

(72) Inventors: Hauke Maschmeyer, Darmstadt (DE); Christian Beidl, Eggersdorf (AT)

(73) Assignee: AVL LIST GmbH, Graz (AT)

( * ) Notice: Subject to any disclaimer, the term of this patent is extended or adjusted under 35 U.S.C. 154(b) by 185 days.

(21) Appl. No.: 15/775,572

(22) PCT Filed: Nov. 8, 2016

(86) PCT No.: PCT/EP2016/076970
§ 371 (c)(1),
(2) Date: May 11, 2018

(87) PCT Pub. No.: WO2017/080999
PCT Pub. Date: May 18, 2017

(65) Prior Publication Data
US 2018/0335370 A1    Nov. 22, 2018

(30) Foreign Application Priority Data
Nov. 11, 2015 (AT) .............................. A 50965/2015

(51) Int. Cl.
*G01M 15/00* (2006.01)
*G01M 17/007* (2006.01)
(Continued)

(52) U.S. Cl.
CPC .......... *G01M 17/007* (2013.01); *G01M 15/02* (2013.01); *G01M 15/042* (2013.01); *G01M 15/102* (2013.01)

(58) Field of Classification Search
USPC ............... 73/115.01, 116.01, 116.02, 116.05, 73/116.06, 117.01, 117.02, 117.03
See application file for complete search history.

(56) References Cited

U.S. PATENT DOCUMENTS 6,079,258 A * 6/2000 List .................... G01M 17/007
                                                73/118.01
6,292,723 B1   9/2001 Brogan et al.
(Continued)

FOREIGN PATENT DOCUMENTS

AT          11000 U2    2/2010
CN       201740647 U    2/2011
(Continued)

OTHER PUBLICATIONS

Chinese Office Action Application No. 201680065691.0 Completed: Aug. 12, 2019 14 Pages.
(Continued)

*Primary Examiner* — Eric S. McCall
(74) *Attorney, Agent, or Firm* — Whitmyer IP Group LLC (57) ABSTRACT

In order to be able to construct test scenarios for vehicle development, with which tests can be carried out on a test bench during development, according to the present teaching, an output test in the form of a sequence of driving manoeuvres is carried out on the test bench with the test specimen and a value of the target variable is determined in this way. The result of the acquisition of the target variable resulting from the output test is divided into test segments and each test segment is checked for target-variable-critical relevance by means of a predetermined target variable relevance criterion. A driving maneuver assigned to the test segment or an assigned driving maneuver segment is recorded in the test if the target-variable-critical relevance of the test segment is given.

10 Claims, 4 Drawing Sheets

(51) Int. Cl.
*G01M 15/02* (2006.01)
*G01M 15/04* (2006.01)
*G01M 15/10* (2006.01)

(56) References Cited

U.S. PATENT DOCUMENTS

| | | | |
|---|---|---|---|
| 7,770,440 B2* | 8/2010 | Langthaler | G01M 13/025 |
| | | | 73/114.15 |
| 8,281,653 B2* | 10/2012 | Schrotter | G01M 15/044 |
| | | | 73/116.01 |
| 8,418,540 B2* | 4/2013 | Schrotter | G01M 15/044 |
| | | | 73/116.02 |
| 9,009,013 B2 | 4/2015 | Krainz et al. | |
| 2008/0190183 A1* | 8/2008 | Erlach | G01M 15/044 |
| | | | 73/114.01 |
| 2012/0285228 A1* | 11/2012 | Grunbacher | G01M 15/044 |
| | | | 73/116.05 |
| 2015/0262434 A1* | 9/2015 | Schnorbus | G05B 17/02 |
| | | | 702/123 |
| 2016/0153818 A1* | 6/2016 | Rosenkranz | F02M 37/0058 |
| | | | 73/114.52 |
| 2016/0171133 A1* | 6/2016 | Pfister | G01M 15/02 |
| | | | 703/8 |
| 2017/0268948 A1* | 9/2017 | List | G01L 5/13 |
| 2018/0024019 A1* | 1/2018 | Schagerl | G01L 5/288 |
| | | | 434/69 |
| 2019/0011329 A1* | 1/2019 | Merl | G01M 13/025 |
| 2019/0041295 A1* | 2/2019 | Pfister | G01M 17/0072 |
| 2019/0310162 A1* | 10/2019 | Pfeiffer | G01M 17/0072 |

FOREIGN PATENT DOCUMENTS

| | | |
|---|---|---|
| CN | 103502952 A | 1/2014 |
| CN | 103857990 A | 6/2014 |
| DE | 102010049690 A1 | 5/2011 |
| DE | 102012018359 A1 | 3/2013 |
| DE | 102012014469 A1 | 5/2014 |
| DE | 102014006322 A1 | 11/2015 |
| JP | 2001206295 A | 7/2001 |
| JP | 2010256354 A | 11/2010 |
| JP | 2013044649 A | 3/2013 |
| WO | 2013003470 A2 | 1/2013 |
| WO | 2015011251 A1 | 1/2015 |
| WO | 2015166067 A1 | 11/2015 |

OTHER PUBLICATIONS

Hirotaka, Kaji; et al. "Individual evaluation scheduling for experiment-based evolutionary multi-objective optimization." International Conference on Evolutionary Multi-Criterion Optimization. Springer, Berlin, Heidelberg, Mar. 5, 2007.
Austrian Search Report Application No. A50965/2015 Completed: Sep. 15, 2016 1 page.
International Search Report and Written Opinion of the International Searching Authority Application No. PCT/EP2016/076970 Completed: Feb. 1, 2017; dated Feb. 9, 2017 12 pages.
Japanese Office Action, Application No. 2018-524261, dated Jun. 1, 2020, 3 Pages.

* cited by examiner

Fig. 7

METHOD FOR PERFORMING A TEST WITH A TEST SPECIMEN ON A TEST BENCH

TECHNICAL FIELD

The present teaching relates to a method for constructing a test for carrying out a test run for a test specimen on a test bench, in order to examine the test specimen with respect to a target variable of the development.

BACKGROUND

There are statutory requirements for permissible pollutant emissions of vehicles (in particular $CO_2$, CO, $NO_x$ and number of particles), e.g. Regulation (EC) No 715/2007 of the European Parliament and of the Council, in which the Euro 5 and Euro 6 Standards are defined. Hitherto, standardized test cycles (e.g. the New European Driving Cycle (NEDC)) on test benches have been used to check that vehicles satisfy these statutory requirements. For this purpose, the emissions generated during the test cycle are sampled at the test bench and examined. The problem in this case is that the conditions on the test bench, under the standardized test cycle, are not comparable with the actual conditions when the vehicle is moving on an actual road. Therefore, a vehicle may satisfy the statutory requirements on the test bench, but nonetheless overstep said requirements during actual operation.

In order to prevent this, legislators are attempting to move the process of checking the predetermined pollutant emissions threshold values from the test bench to the actual road. This requires the pollutant emissions to be measured and checked during an actual journey of the vehicle, on an actual road, using Portable Emissions Measurement Systems (PEMS). There is therefore no longer a standardized test cycle, because a journey on a public road in normal traffic is always subject to random influences. In this case the legislators' aim is that a vehicle should satisfy the pollutant emissions threshold values under normal operating conditions, and not only on the test bench. The legislators also specify requirements for assessing the pollutant emissions after the test drive, e.g. the use of specific data analysis tools.

For this purpose, the legislators have defined a Real Driving Emissions (RDE) test procedure. Therein specific requirements for the vehicle weight, the ambient temperature and the geographical altitude at which the test drive should take place are specified only. In addition, the proportions of the test procedure that should be made up by different driving situations is also defined, for example 33%±10% division among town, country and motorway, but at least 16 km each, vehicle speed in the country in the range of 60-90 km/h, test drive length 90-120 min, etc. Since this check is to be carried out on a public road, each test drive is also subject to random influences, such as other traffic, traffic lights, etc. It is immediately clear therefrom that an actual test drive is not reproducible, but instead in each case constitutes a more or less random chain of events.

This paradigm change also has a direct influence on vehicle manufacturers when developing new vehicles.

Hitherto, each development step could be checked on the test bench, using the standardized test cycles. For this purpose, it was merely necessary for the relevant test specimen to undergo the test cycle and the pollutant emissions to be examined after each development step. This is no longer possible with the new RDE test procedure, since it is in principle not possible to predict whether a newly developed vehicle will pass the RDE test procedure, once the development has been completed, by satisfying the pollutant emissions threshold values. Only the finished vehicle can be driven on the actual road, i.e. the RDE test procedure can be carried out only at the very end of the development. If the vehicle does not pass this check, this would obviously have a huge impact on the vehicle manufacturer which, in an extreme case, would have to repeat a year-long development at least in part, at huge cost and outlay.

It is also of no help to use the previous standardized test cycles during the vehicle development, since the pollutant emissions threshold values being satisfied when standardized test cycles of this kind are applied does not automatically guarantee that these threshold values will be satisfied under the RDE test procedure.

Of course, it would be possible to combine all the possible operating states of a vehicle in one test scenario and use this test scenario to check each development step. However, this is hardly expedient, since implementing a test scenario of this kind on a test bench would take a very long time, and this would slow the development, increase the test bench times, and would be very complex overall. Constructing a test scenario arbitrarily is likewise not expedient, since it would not be possible to guarantee thereby that the statutory requirements would be satisfied under the RDE test procedure.

Furthermore, not every driving maneuver, e.g. accelerating from a low engine speed, overtaking on a country road, turning in urban traffic, etc. will necessarily have the same impact on the pollutant emissions in every vehicle. This means that a test scenario may be suitable for one specific vehicle, but not for a different vehicle.

The above in principle also applies in the same way for other target variables of the development of a vehicle, for example the consumption of a vehicle, although there are no statutory requirements in this regard (or at least not yet). However, the consumption is generally also a development aim when developing a vehicle, and therefore here, too, the aim is to achieve the desired consumption, for example in the RDE test procedure.

In the same way, there may also be further target variables of development, in addition to the pollutant emissions or the consumption, such as the acoustics of the vehicle, the drivability of the vehicle or the durability of the vehicle. Here, too, there is a need to construct suitable tests which make it possible to carry out tests on a test bench even in early development steps in order to guarantee, as far as possible, a later passing of a predetermined test procedure or the satisfying of a specified value for a target variable.

SUMMARY

One object of the present teaching is therefore that of specifying a method that makes it possible to create test scenarios for vehicle development, with which tests can be carried out on a test bench during development, and with which a later passing of a predetermined test procedure for a target variable of the development, or the satisfying of a specified value for a target variable, can be guaranteed as far as possible.

This object is achieved in that an output test in the form of a sequence of driving maneuvers is performed on the test bench with the test specimen and a value of the target variable is determined in this way; the result of the acquisition of the target variable resulting from the output test is divided into test segments and each test segment is checked for target-variable-critical relevance by means of a predetermined target variable relevance criterion; and a driving maneuver assigned to the test segment or an assigned driving maneuver segment is included in the test if the target-variable-critical relevance of the test segment is given. This procedure uses an output test in order to incorporate in the test, for a specific test specimen or vehicle, only those driving maneuvers or driving maneuver segments which guarantee that the test specimen will be triggered in a corresponding target-variable-critical manner. In this way, a compact, short test can be constructed which, however, provides a great deal of information content with respect to checking the target variable to ensure that specific test procedures or requirements are satisfied. This approach also makes it possible to expose weak points of the test specimen. If the test specimen reveals significant target variable values, e.g. high pollutant emissions or a high consumption, during characteristic driving maneuvers such as acceleration from a low engine speed, this can be an important input for the development and something to be specifically worked on.

It is particularly advantageous for a target variable relevance value regarding a specific target variable to be stored for a driving maneuver, and for only those driving maneuvers of which the target variable relevance value exceeds a target variable specified value to be selected for the output test. In this way, the output test can already be designed so as to guarantee best possible triggering of the relevant target variable. This can make it possible to keep even the output test, and thus the required test bench time, as short as possible.

It may also be advantageous for specific boundary conditions of the test specimen to be stored for a driving maneuver, and for only those driving maneuvers of which the boundary conditions match the test specimen to be selected for the output test. This also makes it possible to focus the output test very deliberately on a specific test specimen.

The method is more flexible when a driving maneuver is stored as a generic driving maneuver in the driving maneuver database, and when a route comprising the generic driving maneuver is selected as a driving maneuver from a route database comprising known routes. Specifying known routes allows the output test to be designed so as to be highly variable.

BRIEF DESCRIPTION OF THE DRAWINGS

The present teaching will be explained in greater detail in the following, with reference to FIGS. 1 to 7 which schematically show non-limiting, advantageous embodiments of the present teaching given by way of example. In the drawings.

DETAILED DESCRIPTION

Figure 1:
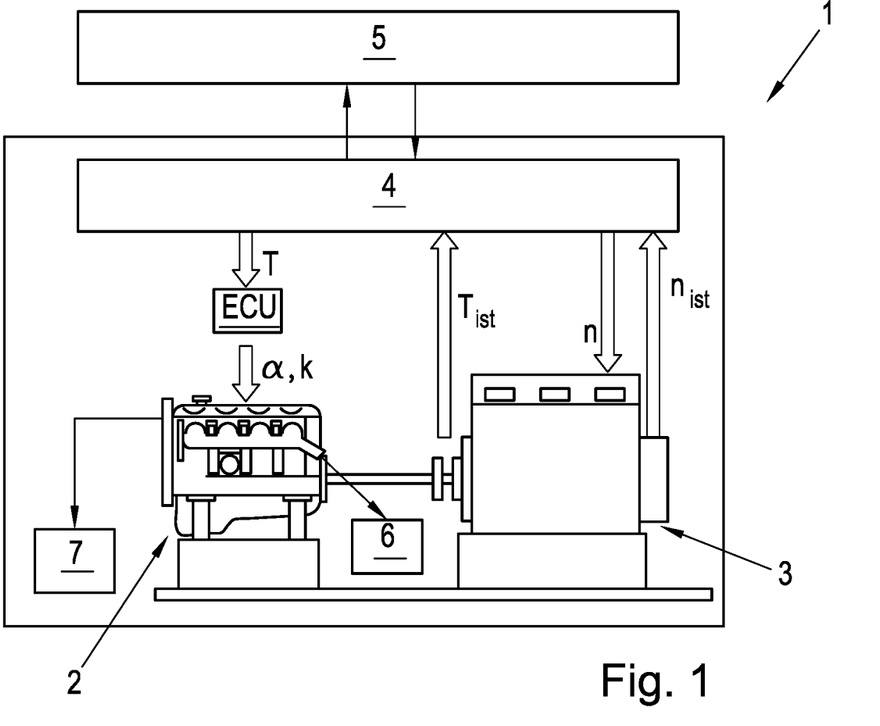
FIG. 1 shows a typical test bench structure for a test specimen.

FIG. 1 shows a typical test bench 1 for a test specimen 2, in this case an engine test bench for an internal combustion engine. The test specimen 2 is connected to a load machine 3, for example by means of a connecting shaft as in FIG. 1. The test specimen 2 may, however, also be a drive train or an entire vehicle. Accordingly, the test bench 1 would be a drive train test bench or a chassis dynamometer, it also being possible to provide more than one load machine, e.g. one per driven half-axle or per axle. In this case, the test specimen 2 is operated on the test bench 1 in accordance with the specifications of a test run in order to obtain information regarding specific target variables of the development of the vehicle, such as pollutant emissions, a consumption, the acoustic behavior of the vehicle, the drivability of the vehicle, the durability of the vehicle, etc. If the target variable of the development is the pollutant emissions of an internal combustion engine or the consumption of an internal combustion engine, the test specimen 2 also always comprises an internal combustion engine.

The test bench 1 is controlled by a test bench automation unit 4. Said unit controls both the test specimen 2 and the load machine 3 in accordance with specific requirements (test). The test thus includes all the necessary information for carrying out the test on the test bench 1 using the test specimen. For this purpose, for example, the load machine 3 can set an engine speed n of the test specimen 2 and the test specimen 2 can be actuated so as to generate a desired torque T, for example by specifying a throttle valve position a and/or a gas quantity k by means of an engine control unit ECU. Robot drivers may also be provided on a chassis dynamometer, which drivers activate the control elements of the vehicle, such as the gas pedal, brake pedal, gear shift, in accordance with the requirements of the test to be carried out. A row of measuring sensors (not shown in greater detail) is generally also provided on the test bench 1, which sensors for example acquire current actual values of the torque $T_{ist}$ and the engine speed $n_{ist}$ of the test specimen 2.

Depending on the target variable Z of the development, corresponding measuring units for the target variable Z, such as an emission measuring unit 6, to which the emissions from the internal combustion engine are supplied and which measures the specified pollutant emissions, such as $CO_2$, CO, $NO_x$, total mass of hydrocarbons (THC) and/or number of particles (such as soot particles), and/or a consumption measuring unit 7 that measures the fuel consumption of the internal combustion engine, may be provided on the test bench 1.

The test bench automation unit 4 receives the requirements of the test to be carried out from a test control unit 5. In principle, it would also be conceivable for the test bench automation unit 4 and the test control unit 5 to be combined in a single unit. The test control unit 5 specifies particular desired values to the test bench automation unit 4, in accordance with the requirements of the test, at each specified time step k, e.g. every millisecond, which desired values are then converted into the control variables for the test specimen 2 and/or the load machine 3, i.e. for example into a torque T(k), a load value (e.g. a throttle valve position) or an engine speed n(k), and are then adjusted or set on the test bench 1 by the test bench automation unit 4, by means of actuating the test specimen 2 and/or the load machine 3.

In the simplest case, the test may be defined in the test control unit 5 as a simple distance-based or time-based speed or torque curve of the vehicle, which is then converted into a torque T and an engine speed n of the test specimen 2 for example. The test is then defined as a firmly specified course.

Figure 2:
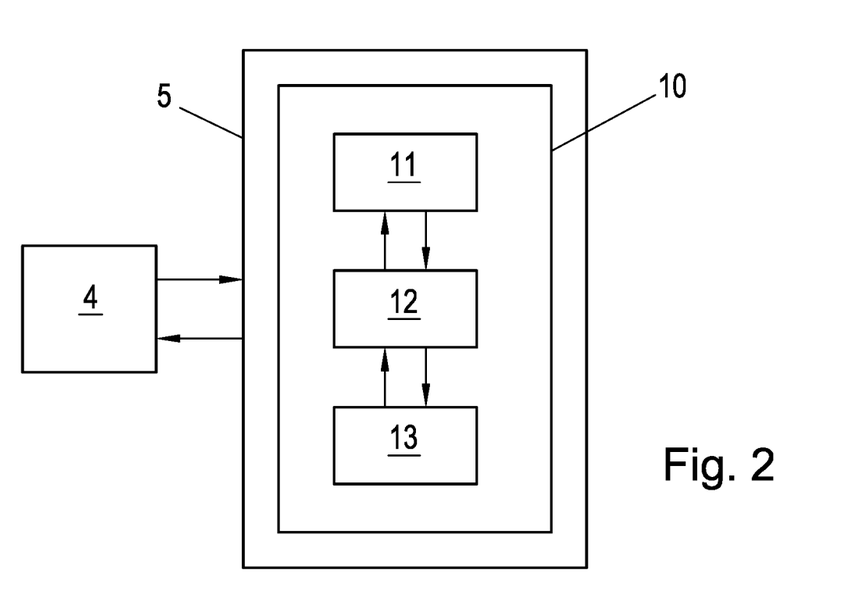
FIG. 2 shows a possible embodiment of a simulation unit for simulating a virtual test drive of a virtual vehicle.

In a preferred embodiment, a simulation unit 10 (simulation hardware and/or simulation software) is provided in the test control unit 5, by means of which simulation unit a number of simulation models of a test drive of a vehicle is simulated, as shown in FIG. 2. For this purpose, for example a driver model 11, a vehicle model 12 and an environment model 13 is implemented as a simulation model in the simulation unit 10, it also being possible for other models, such as a tire model, a road model, etc. to be implemented. The simulation unit 10 thereby simulates the journey of a virtual vehicle (vehicle model 12), controlled by a virtual driver (driver model 11), along a virtual test route (environment model 13), it being possible for specific events, such as road signs, traffic lights, other traffic, etc. to also be simulated. The virtual driver implements events in the driver model. Parameterization of the simulation models also makes it possible for different influences to be taken into account, such as a conservative or sporty driver, road conditions, weather, etc. A portion of the vehicle, such as the internal combustion engine or a drive train, is constructed physically on the test bench 1, in the form of actual hardware, as the test specimen 2, and is operated using the requirements of the simulation, in accordance with the test, on the test bench 1. This approach to carrying out a test is also well known, and was often referred to as X-in-the-Loop testing, the "X" referring to the relevant test specimen 2 that is actually present. This manner of carrying out a test is very flexible and comes very close to the nature of an actual test drive using an actual vehicle.

According to the present teaching, it is now a matter to define a test, either as a virtual test drive in a simulation or as a simple distance-based or time-based speed-torque curve, by means of which the test specimen 2 can be checked in such a way that a vehicle comprising said test specimen 2 is highly likely to satisfy the requirements regarding a target variable Z of the development of the vehicle. In the case of pollutant emissions as the target variable Z, in an RDE test procedure for example the statutory requirements regarding the pollutant emissions should be satisfied. In order to achieve this aim, an approach is taken as described in the following, pollutant emissions being assumed as the target variable Z without restricting the generality.

An output test is assumed that contains many different driving maneuvers FMx. In this case, a driving maneuver FMx is to be understood as an acceleration, a deceleration, a standstill, constant travel, cornering, etc. under specific boundary conditions, such as engine speed, torque, steering lock, road gradient, traffic, etc. In this case, a driving maneuver FMx may also be an aggregation of fundamental driving procedures of this kind. A driving maneuver FMx may also be divided into driving maneuver segments FMAxy. A driving maneuver FMx may, for example, be implemented as starting up from standstill, accelerating out of a bend, changing the vehicle speed, overtaking a slow vehicle, coming to a stop at a red traffic light, etc. Each journey of a vehicle, and thus also a test, can be considered to be a temporal sequence of driving maneuvers FMx of this kind. The driving maneuvers FMx may be stored in a driving maneuver database. Stored driving maneuvers FMx result, for example, from actual measured test drives, from simulations already carried out, etc.

An output test is then constructed as a temporal sequence of driving maneuvers FMx of this kind. This may be carried out manually by a user, by randomly selecting the driving maneuvers FMx, or by a deliberate selection (as will be described in greater detail below). It is important to note at this point that the driving maneuvers FMx must be linked together such that there are no discontinuities in the output test, which per se is a matter of course. It would be unrealistic, for example, for a sudden significant change in speed to occur between two successive driving maneuvers FMx. In this case, the output test should contain many different driving maneuvers FMx, which should preferably cover as large as possible an operating range (engine speed, torque) of the vehicle.

Figure 3:
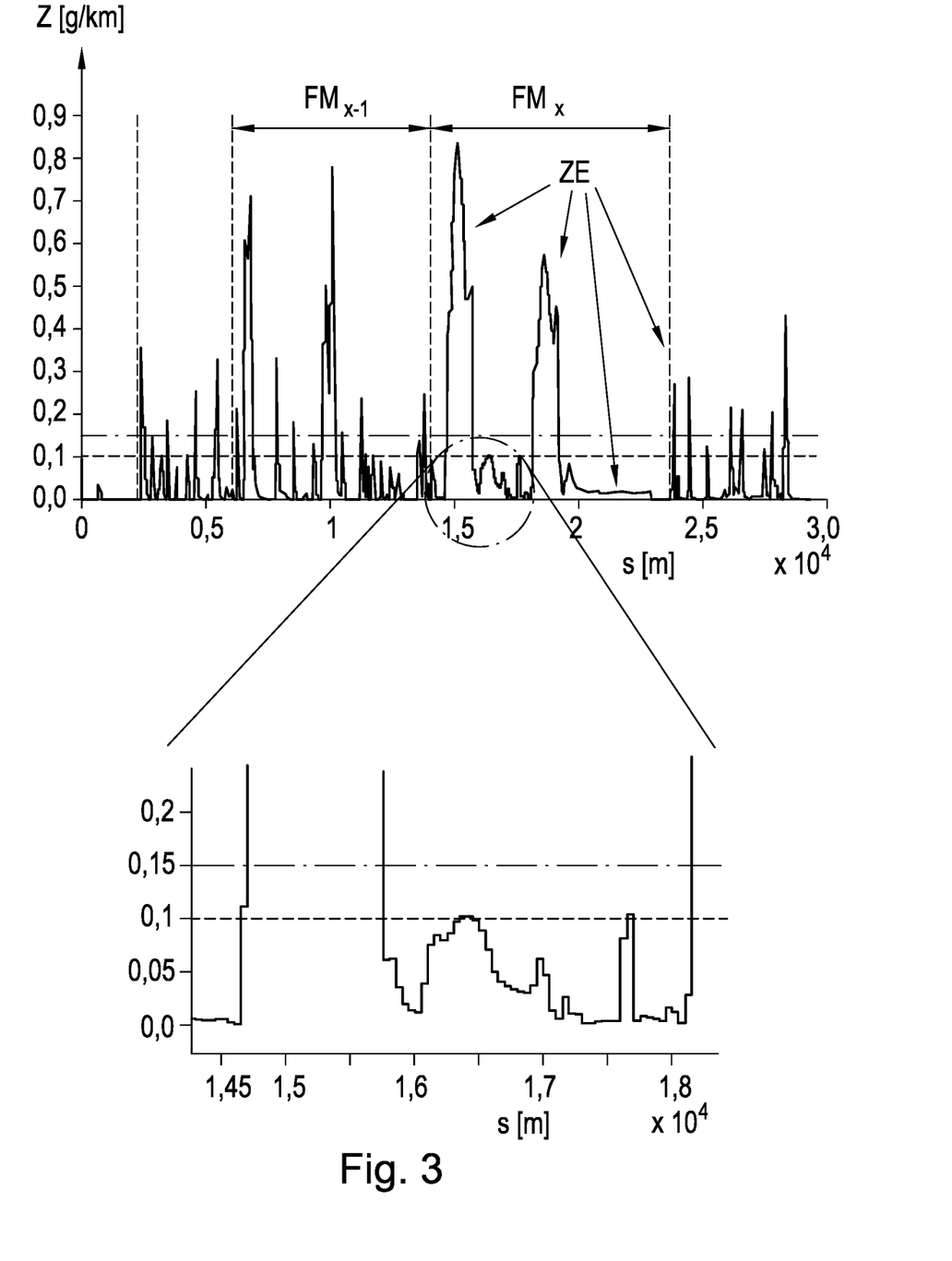
FIG. 3 shows the result of a target variable measurement when carrying out an output test.

The output test constructed in this way is then performed on the test bench 1 using a specific test specimen 2, and in the process the pollutant emissions are measured as the target variable Z. The result of a measurement of this kind is shown in FIG. 3, using the example of the total amount of hydrocarbon emissions THC plotted against the distance travelled s (it also being possible for the time to be plotted in the same manner). Since the sequence of the driving maneuvers FMx in the output test is known, each point on the distance axis (time axis) can be assigned to a specific driving maneuver FMx or a driving maneuver segment FMAxy of the output test AV. A plurality of successive target variable events ZE (solid line), in this case emission events, can be seen in the drawing. A value representing the target variable Z, for example the pollutant emissions, can be totaled over a specified distance (e.g. every 50 m), as the target variable event. The dashed horizontal line marks a specified value for target variables Z, for example the statutory threshold value for the pollutant emissions (here, THC), and the dash-dot line marks a fixed assessment threshold, e.g. 1.5 times the statutory threshold value, the assessment threshold preferably being greater than or equal to the statutory threshold value. In this case, the assessment threshold does not necessarily need to be constant over the distance s or over the time, but instead can also vary.

Figure 4:
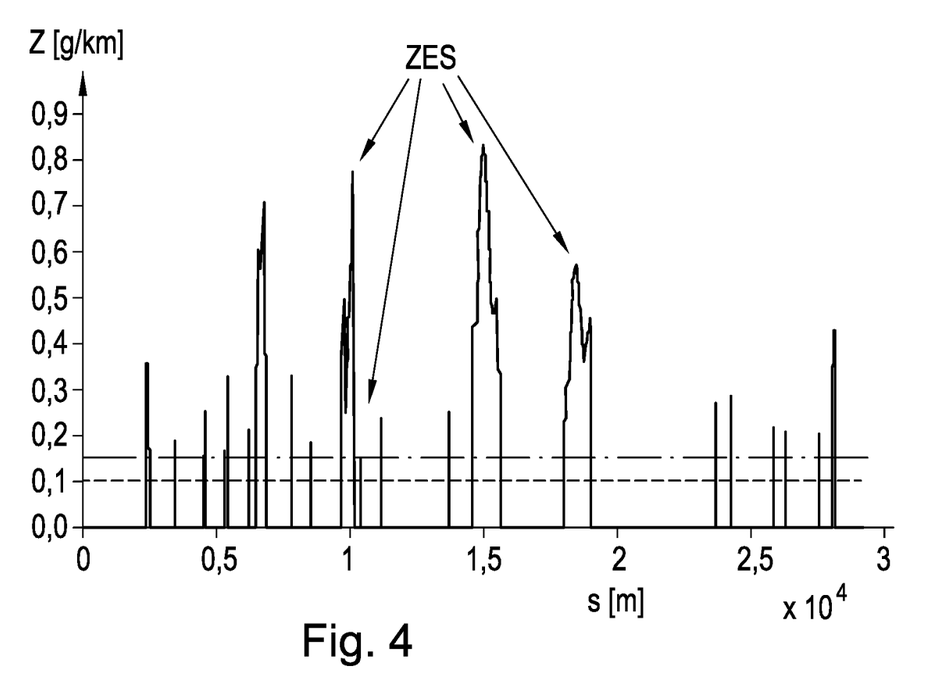
FIG. 4 shows the elimination of certain target variable events during the target variable measurement.

In a first step, all the target variable events ZE that are below the assessment threshold are consistently set to zero pollutant emissions (indicated in FIG. 4). Thus, only those target variable events ZE remain that constitute critical target variable events with respect to the target variable ZE. Target variable event peaks ZES thus result above the assessment threshold and regions therebetween that are ignored.

In the next step, the distance s is divided into test segments TSm. In this case, test segments TSm of the same length or of different lengths, for example a test segment=500 m, can be provided. In the process, an expedient division into the test segments TSm is of course desired, for example such that there is just one target variable peak ZES in a test segment TSm in each case. However, the division preferably takes place according to the driving maneuvers FMx or possible y segments of the driving maneuvers FMx, i.e. one test segment TSm is equated to one driving maneuver FMx (as in FIG. 5) or one driving maneuver segment FMAxy. This makes it possible to directly and simply assign target variable event peaks to a driving maneuver FMx or a driving maneuver segment FMAxy, which can facilitate the evaluation.

Figure 5:
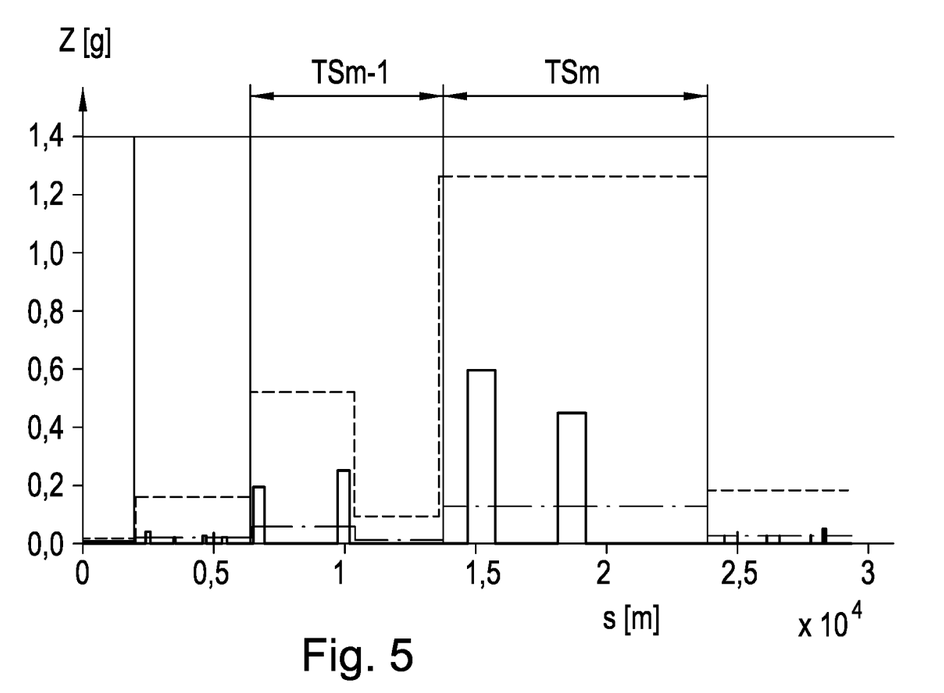
FIG. 5 shows a further elimination of certain target variable events during the target variable measurement.
Figure 6:
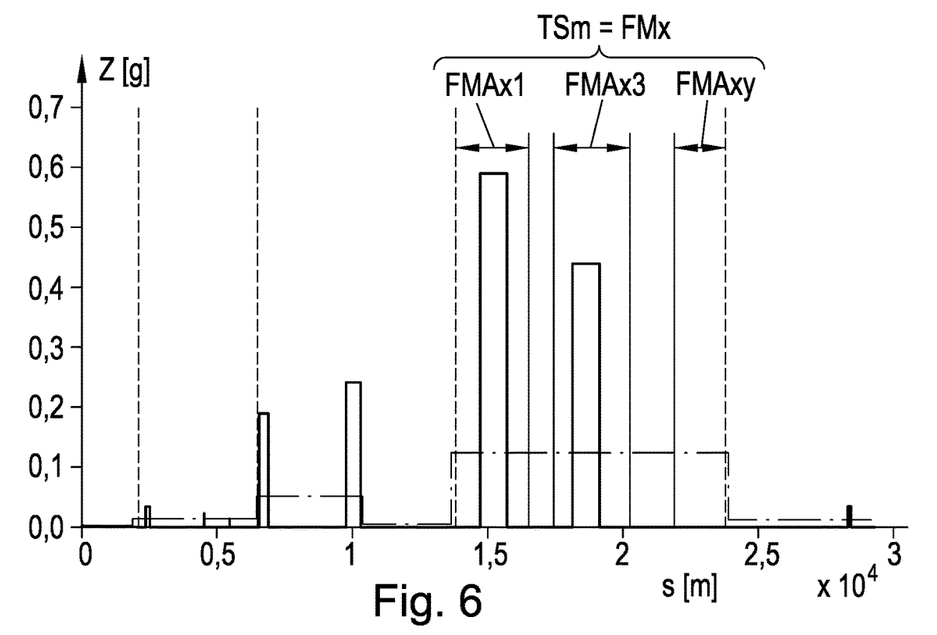
FIG. 6 shows a possible result of the elimination of certain target variable events during the target variable measurement.

After that, in the case of pollutant emissions as the target variable Z, the total mass of pollutant emissions in the test segment TSm is determined for each test segment TSm (dashed line in FIG. 5). A portion of the total mass is specified as the assessment mass, for example 10% of the total mass (dash-dot line in FIG. 5). The associated result mass is then ascertained for each remaining target variable event peak ZES by determining the total mass of each target variable peak event ZES (solid lines in FIG. 5), and all the target variable event peaks of which the event mass is below the assessment mass are consistently set to zero. Therefore, only a few of the plurality of target variable event peaks ZES remain, as shown in FIG. 6.

The driving maneuvers FMx or driving maneuver segments FMAxy associated with said target variable event peaks are then combined to form the test, the present sequence of the driving maneuvers FMx or driving maneuver segments FMAxy not necessarily needing to be adhered to. In the example according to FIG. 6, the partial segment TSm corresponds to the driving maneuver FMx, which is in turn divided into a number y of driving maneuver segments FMAxy. The entire driving maneuver FMx could now be used for the test, or just the driving maneuver segments FMAx1, FMAx3 which contain a target variable event peak, it of course also being possible for other driving maneuver segments FMAxy to be used, for example in order to satisfy other requirements of a test procedure (such as the RDE test procedure). In this case, it is of course also important to prevent or even out discontinuities between successive driving maneuvers FMX or driving maneuver segments FMAxy in the constructed test. Thus, only those driving maneuvers FMx or driving maneuver segments FMAxy that have a significant effect for the specific test specimen 2 with regard to the target variable Z remain for the test. The constructed test may have an entirely different appearance for another test specimen 2 or another target variable Z, since another test specimen 2 can generate entirely different target variable event peaks for the same output test. In this way, an originally very long output test can be condensed to a substantially shorter test without having to accept impairment with regard to checking the target variable Z, for example by means of an RDE test procedure. Of course, different target variables Z can be examined in this manner and the test can also be made up of target variable events ZE that result from different target variables Z. A test of this kind would then trigger a plurality of target variables Z.

The first step, above, could of course also be omitted, and it is also possible, in particular depending on the relevant target variable Z, to select an evaluation method other than the emissions mass in the second step. In general terms, the result, from the output test, of measuring the target variable Z, is divided into test segments TSm, and each test segment TSm is checked for target-variable-critical relevance by means of a predetermined target variable relevance criterion for the target variable Z. In the embodiment above, two target variable criteria are specified, namely the assessment threshold in the first step, and the assessment mass in the second step. The target-variable-critical relevance can thus also be determined in multiple steps. If the target-variable-critical relevance of a test segment TSm is given, the driving maneuver FMx assigned to the test segment TSm or the associate driving maneuver segment FMAxy is incorporated into the test PV, otherwise not.

The test PV constructed in this manner contains, as a result, the driving maneuvers FMx and/or driving maneuver segments FMAxy, in order to selectively trigger the target-variable-critical operating states of a very specific vehicle, which is decisive for checking the target variable behavior of the vehicle, for example in accordance with the RDE test procedure. The test PV constructed in this manner thus makes it possible to carry out the development of the vehicle in all development stages, and significantly increases the likelihood of satisfying certain requirements of the target variable, such as statutory threshold values for pollutant emissions, when checked using an RDE test procedure. The same also applies similarly for other target variables Z, such as the consumption, the driveability, the acoustic behavior, the durability, in place of pollutant emissions.

The method described above can be further improved if the driving maneuvers FMx in the driving maneuver database also contain information regarding the target variable relevance of the driving maneuver FMx in question, with respect to a specific target variable Z. The background to this is that a specific driving maneuver FMx, such as accelerating from a low engine speed, may have a high target variable relevance with respect to a first target variable, but a low target variable relevance with respect to a second target variable. In this case, the target variable relevance may be specified, for example, as a whole-number, positive target variable relevance value.

In addition, relevant prerequisites or boundary conditions can also be stored in the driving maneuver database for the driving maneuvers FMx, for which prerequisites or conditions the driving maneuver FMx is valid. In this case, the boundary conditions define the test specimen 2 in greater detail. For example, there may be driving maneuvers FMx for Otto and Diesel engines. This division can be further refined almost as desired, for example Otto engines having a homogeneous combustion process, turbocharging and exhaust gas recirculation. Depending on the test specimen 2, only the driving maneuvers FMx are then selected from the driving maneuver database that comply with these boundary conditions.

Of the driving maneuvers FMx that comply with possible boundary conditions, it is then possible to select, as a target variable specified value for the output test AV, all those driving maneuvers that have a higher target variable relevance value with respect to a specific target variable Z. In this way, an output test AV can be constructed which as far as possible contains only those driving maneuvers FMx that have a theoretical target variable relevance with respect to the target variable Z in question. Carrying out the output test on the test bench 1 then shows the actual target variable relevance for each test specimen 2.

It is also conceivable for the driving maneuver database to in part contain only generic driving maneuvers FMx, i.e. for example only constant travel, or acceleration from a low engine speed, etc. However, in order to construct an output test AV and test PV, specific driving maneuvers are required, i.e. for example constant travel at 60 km/h and an engine speed of 1500 $min^{-1}$, or acceleration from 110 km/h at 1500 $min^{-1}$ to 130 km/h at full speed, etc. A route database may be provided for this purpose, in which database measured or already simulated routes or constructed simulations are stored. Measured routes are routes that have been travelled by an actual vehicle and measured in the process, i.e. for example measuring the speed, engine speed, torque, events (traffic lights, road signs, traffic, etc.), course of the road, etc. It is then possible to select, for a generic driving maneuver FMx such as starting up at a traffic light that has turned green, a route from the route database in which said driving maneuver FMx occurs. The route, or a specific route segment of the route (if said route is segmented) is then assumed as the specific driving maneuver FMx. However, the driving maneuvers FMx can also be stored in the driving maneuver database as specific driving maneuvers.

Figure 7:
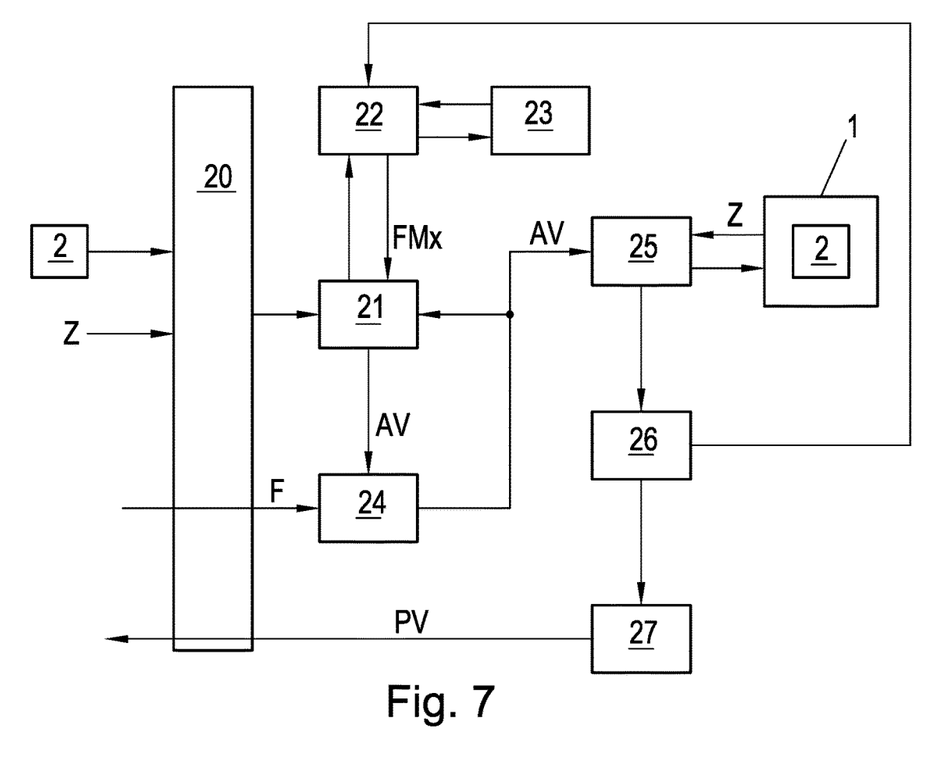
FIG. 7 shows a possible course of the method according to the present teaching.

The possible sequence of the method is shown in the functional block diagram according to FIG. 7. Boundary conditions for the test specimen 2, i.e. for example Otto engine having a turbocharger and exhaust gas recirculation, and the target variables Z of interest, e.g. pollutant emissions or consumption V, are input at a user interface 20. During the output test construction 21, the driving maneuvers FMx which match these boundary conditions are selected from a driving maneuver database 22. Optionally, the driving maneuver database 22 may also access a route database 23 in order to make a generic driving maneuver into a specific driving maneuver. The output test AV thus constructed can now optionally be examined for possible errors, in a pre-simulation 24. For this purpose, the output test AV can be simulated using a vehicle model F that is provided or that is specified via the user interface. If errors or problems arise in this case, the step of constructing the output test AV can be repeated or adapted in the output test construction 21. Manual intervention is also conceivable at this point. In the step of test specimen characterization 25, the output test AV is then started on the test bench 1 and using the specific test specimen 2. In the process, values for the target variable Z, e.g. the pollutant emissions or the consumption, are acquired metrologically. The result of the measurement or acquisition of the target variable Z is checked for target-variable-critical relevance by means of a predetermined target variable relevance criterion in an evaluation unit 26. Driving maneuvers FMx or driving maneuver segments FMAxy having a target-variable-critical relevance of this kind are then put together to the test PV in a test generation 27 made available to the user interface 20, in the form of the result. The driving maneuvers FMx or driving maneuver segments FMAxy having a target-variable critical relevance of this kind can also be included in the driving maneuver database 22.

The invention claimed is:

1. A method for constructing a test for carrying out a test run for a test specimen on a test bench, in order to examine the test specimen with respect to a target variable, comprising:
    performing a prespecified output test in the form of a time sequence of driving maneuvers on the test bench with the test specimen;
    measuring the target variable during the prespecified output test;
    dividing the measured target variable resulting from the prespecified output test into test segments;
    checking each test segment for target-variable-critical relevance by a predetermined target variable relevance criterion;
    including a driving maneuver or driving maneuver segment assigned to a test segment in the test if the target-variable-critical relevance of the test segment is satisfied.

2. The method according to claim 1, wherein a target variable relevance value regarding a specific target variable is stored for a plurality of driving maneuvers, and only those driving maneuvers of the plurality of driving maneuvers for which the target variable relevance value exceeds a pre-specified value are selected for the output test.

3. The method according to claim 1, wherein specific boundary conditions of the test specimen are stored for a plurality of driving maneuvers, and only those driving maneuvers of the plurality of driving maneuvers for which the boundary conditions match the test specimen are selected for the output test.

4. The method according to claim 1, wherein a driving maneuver is stored as a generic driving maneuver in a driving maneuver database, and a route comprising the generic driving maneuver is selected as a driving maneuver for the output test from a route database comprising known routes.

5. The method of claim 1, further comprising performing the test on the test bench using the test specimen.

6. A test bench, comprising:
    a control unit having the test constructed by claim 1.

7. The method of claim 1, wherein the target variable comprises a measure of pollutant emission, acoustics of the vehicle, drivability of the vehicle, or durability of the vehicle.

8. A method for constructing a test for a test bench to examine a test specimen with respect to a target variable, comprising:
    performing an initial test in the form of a sequence of driving maneuvers on the test bench with the test specimen;
    measuring the target variable during the initial test;
    dividing the measured target variable into test segments;
    checking each test segment for target-variable-critical relevance by a predetermined target variable relevance criterion;
    including a driving maneuver or driving maneuver segment assigned to a test segment in the test if the target-variable-critical relevance of the test segment is satisfied.

9. A test bench, comprising:
    a control unit having the test constructed by claim 8.

10. The method of claim 8, further comprising:
    repeatedly performing the test on the test bench using the test specimen;
    wherein the target variable comprises a measure of pollutant emission.

* * * * *